(No Model.)

W. S. GRAFTON.
METALLIC MOLDING.

No. 502,357. Patented Aug. 1, 1893.

WITNESSES:

INVENTOR.
William S. Grafton
BY
Baldwin Davidson Wight
ATTORNEYS (No Model.)  2 Sheets—Sheet 2.

W. S. GRAFTON.
METALLIC MOLDING.

No. 502,357.   Patented Aug. 1, 1893.

WITNESSES:  
Sidney P. Hollingsworth  
W. Washington Miller

INVENTOR.  
William S. Grafton  
BY Baldwin Davidson Wight  
ATTORNEYS

UNITED STATES PATENT OFFICE.

WILLIAM S. GRAFTON, OF STEUBENVILLE, OHIO, ASSIGNOR TO THE WHEELING CORRUGATING COMPANY, OF WHEELING, WEST VIRGINIA.

METALLIC MOLDING.

SPECIFICATION forming part of Letters Patent No. 502,357, dated August 1, 1893.

Application filed April 8, 1893. Serial No. 469,596. (No model.)

*To all whom it may concern:*

Be it known that I, WILLIAM S. GRAFTON, a citizen of the United States, residing at Steubenville, in the county of Jefferson and State of Ohio, have invented certain new and useful Improvements in Metallic Moldings, of which the following is a specification.

My invention more especially relates to metallic moldings for ornamenting metallic ceilings.

The object of my invention is to form sections of the molding in such manner that they may be readily joined together to produce concealed joints and a continuous effect, and that the angles, turns or joints of the design may be made with the greatest facility, and without any break in the design.

Figure 1:
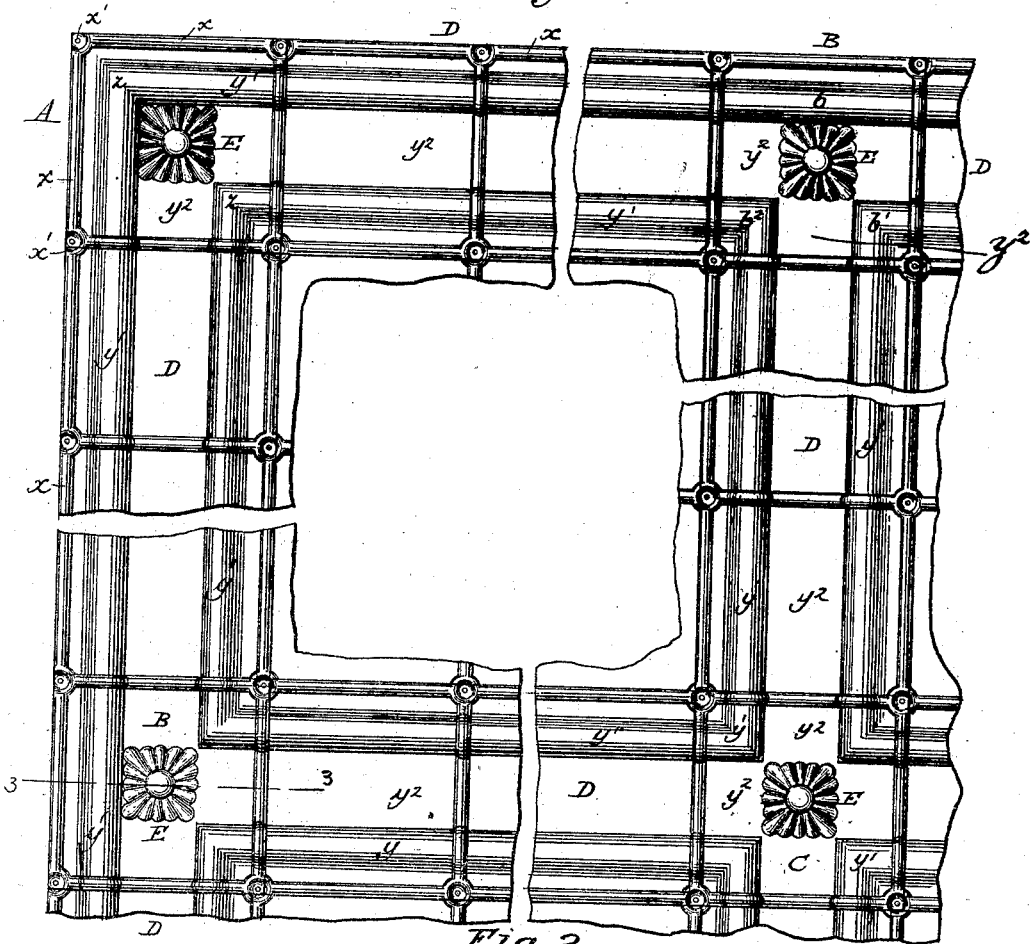
Figure 2:
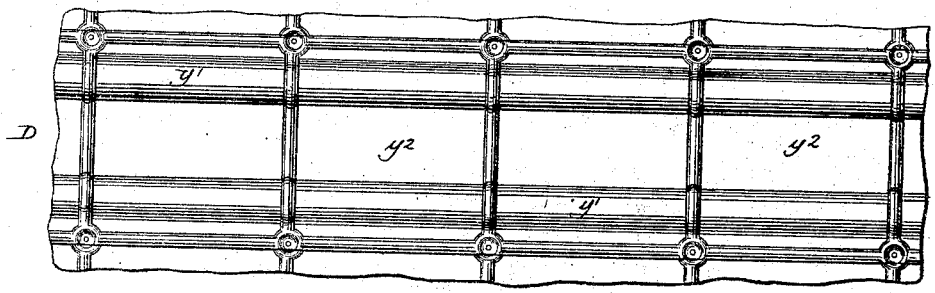
Figure 3:
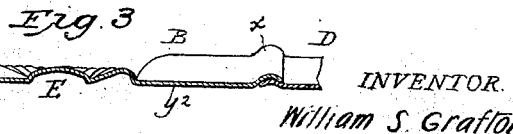
Figure 4:
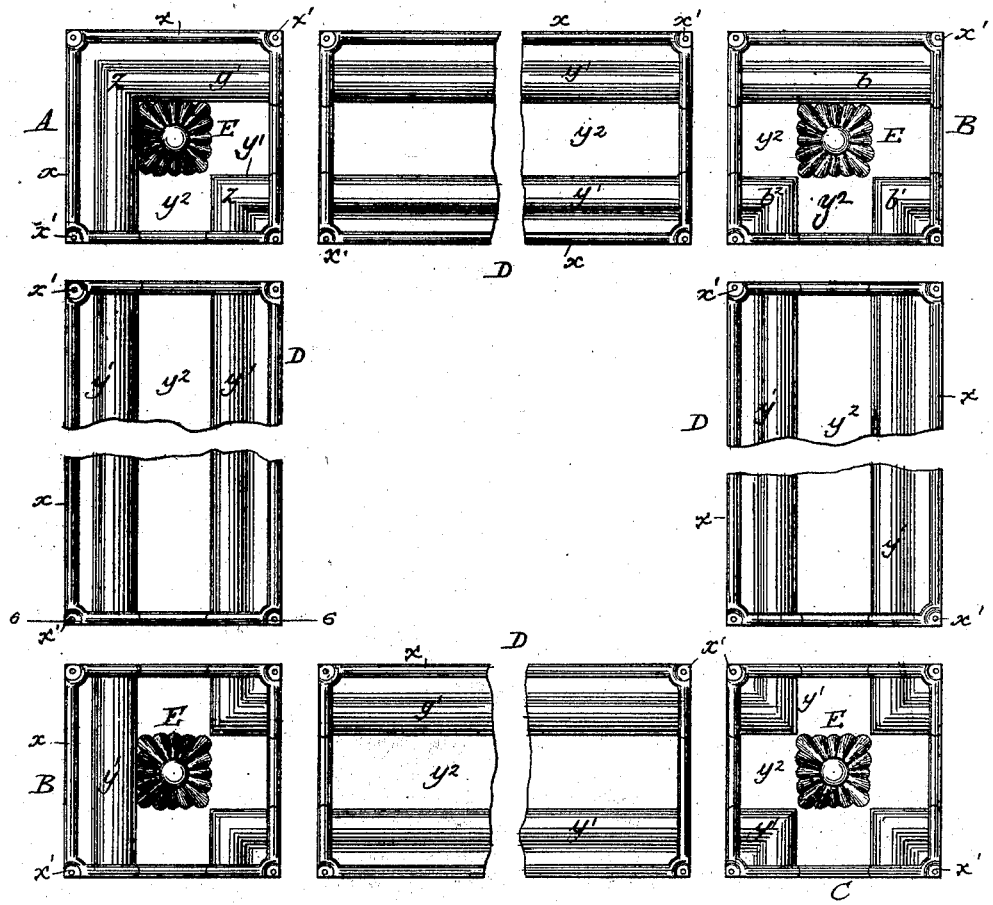
Figure 5:
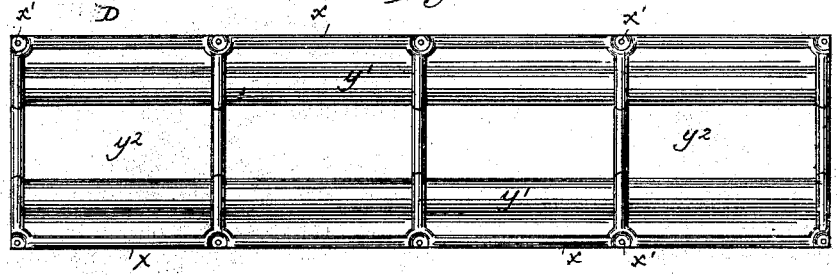
Figure 6:
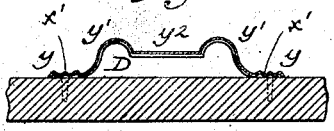

In the accompanying drawings,—Figure 1 is a view of a number of molding sections joined together to form a border or borders for the ceiling plates in several panels. Fig. 2 is a detail view of a number of molding sections connected together and joined to plain or flat ceiling plates. Fig. 3 is a cross section on the line 3—3 of Fig. 1. Fig. 4 is a view of a number of molding sections disconnected, but in close proximity to each other, showing the form and construction of each section, and the manner in which a number of them are arranged to inclose a panel. Fig. 5 is a view of a molding section in which several subdivisions are included or formed from a single piece of metal. Fig. 6 is a transverse, section on the line 6—6 of Fig. 4.

The corner pieces for the molding are rectangular, preferably square, as are also the sections at the junction of adjacent panels. The other portions of the molding may be made of greater length than the corner pieces, and junction pieces, and these are made to join so that the joints or seams will be concealed.

In the drawings, A, indicates the corner pieces; B, the junction pieces connecting two adjacent panels; C, junction pieces arranged at the contiguous angles of four panels, and D, the molding sections proper.

Each of the sections A, B, C has at its edges, hollow ribs or ridges $x$, and at the corners, hollow projections or recesses $x'$, to form artificial rosettes. The molding sections D, are in like manner formed with hollow ribs or ridges $x$ at their edges, and with artificial rosettes $x'$ at their corners. The distances between the rosettes on all the plates are the same, so that when the sections are joined together, the ribs and rosettes will overlap, a firm connection will be made and the joint will be practically concealed.

The precise way of forming the interior or body portion of the molding sections is, so far as some features of my invention are concerned, not important. As shown particularly in cross section, Fig. 6, the molding sections are formed with flat or horizontal portions $y$ $y$, which are joined to raised portions $y'$ $y'$ that are somewhat S-shaped in cross section, their upper downwardly projecting ends connecting with a flat, horizontal, plain sunken portion $y^2$. The corner pieces A have the ornamental parts formed with right-angled turns $z$, each of the portions $y'$ and $y^2$ being L-shaped so that the molding sections arranged at right angles to each other may be joined at the corners of a ceiling with a continuous effect. The joining section B, arranged between two adjacent panels, has the portion $y^2$ formed T-shaped, the raised portion $b$, being straight, to form a straight continuation of the corresponding portion in the adjacent molding section D. On the opposite side of the plain portion $y^2$, of the section B, the raised portions $b'$ $b^2$ have a right-angular turn or are somewhat L-shaped, so as to form straight continuations of the corresponding portions in the adjacent molding sections. The junction piece C, is rectangular in outline, and has the portion $y^2$ formed cross-shaped, with the raised portions $y'$ suitably shaped to permit of the cross formation and to join properly the corresponding portions in adjacent molding sections. I preferably form in each of the junctions or corner pieces A, B, C, artificial ornamental rosettes E. It will be observed that the joints are of the simplest character. The plates have all symmetrical formations. There are no ragged edges or projecting arms, flanges or lugs, and the raised and sunken portions of the molding sections both at the junctions and corners, with the main portions of the molding, match and produce a continuous effect. The artificial rosettes x' are so formed and disposed that they overlap where the sections are joined, and a single nail may be used to secure two or more plates to the backing or frame on which the molding sections and plates are mounted. Each of the sections, corner pieces, &c., is made of a single piece of metal in contradistinction to being formed composite or of several pieces, as has heretofore been done.

I claim as my invention—

1. A metallic molding section having hollow ribs or ridges at one or more of its edges, and artificial rosettes at one or more of its corners, both rosettes and ridges being formed to match corresponding ridges and rosettes in the edges and corners of adjacent plates.

2. A corner piece for a molding, in which the raised and sunken portions are L-shaped and formed to match and form continuations of the raised and sunken portions in adjacent molding sections and having hollow ribs or ridges at one or more of its edges, adapted to match corresponding ridges in the edges of adjacent plates.

3. The herein described square corner piece having hollow ribs or ridges at its edges, adapted to match corresponding ribs or ridges in adjacent molding sections, and having the raised and sunken portions on the body of the plate L-shaped, substantially as described.

4. The herein described junction piece rectangular in outline, having raised and sunken portions to form a molding, the sunken portion thereof being T-shaped, and the raised portions suitably formed to admit of the T-shaped formation of the sunken portion, both the raised and sunken portions being so formed as to match and form continuations of the corresponding portions in adjacent molding sections, and one or more of the edges of the junction piece having a hollow rib or ridge to overlap a corresponding rib or ridge at the edge of an adjacent ceiling plate or molding section.

5. The herein described junction piece for a metallic molding having the central portion thereof cross-shaped and adapted to match corresponding portions in adjacent molding sections and having at its four edges hollow ribs or ridges adapted to overlap and match corresponding ribs or ridges in adjacent molding sections.

6. The junction piece herein described, having the central portion thereof cross-shaped and having its edges formed with hollow ribs or ridges adapted to match corresponding ribs or ridges in adjacent molding sections.

7. The herein described square corner piece having hollow ribs or ridges at its edges, and artificial rosettes at its corners, adapted to match corresponding ribs or ridges and rosettes in adjacent molding sections or ceiling plates, and having the raised and sunken portions of the plate L-shaped, substantially as described.

8. The combination of a corner piece having a raised portion to form a molding and having hollow ribs or ridges at one or more of its edges, a molding section having a hollow rib or ridge at its edge adapted to match the rib or ridge in the corner piece and having also a raised portion to form the molding, which is adapted to match and form a continuation of the molding in the corner piece, the body of the corner piece and the molding section being in substantially the same plane.

In testimony whereof I have hereunto subscribed my name.

WILLIAM S. GRAFTON.

Witnesses:
E. C. EWING,
ALEX. GLASS.